(12) United States Patent
Wang (10) Patent No.: US 6,997,466 B2
(45) Date of Patent: Feb. 14, 2006

(54) MOBILE BASE

(76) Inventor: Wang Tien Wang, No. 45, Yi Chang Esst Rd., Taiping, Taichung Hsien (TW)

( * ) Notice: Subject to any disclaimer, the term of this patent is extended or adjusted under 35 U.S.C. 154(b) by 125 days.

(21) Appl. No.: 10/772,363

(22) Filed: Feb. 6, 2004

(65) Prior Publication Data

US 2005/0173877 A1    Aug. 11, 2005

(51) Int. Cl.
*B62D 21/14* (2006.01)

(52) U.S. Cl. .................................. 280/43.17; 16/34

(58) Field of Classification Search ............... 280/43, 280/43.17, 79.11; 16/32, 34; 144/285
See application file for complete search history.

(56) References Cited

U.S. PATENT DOCUMENTS

| | | | | |
|---|---|---|---|---|
| 2,033,207 A | * | 3/1936 | Schultz, Jr. ............... | 16/32 |
| 2,597,213 A | * | 5/1952 | Whiteman ................ | 14/72.5 |
| 2,812,189 A | * | 11/1957 | Geldhof ................ | 280/43.14 |
| 3,333,860 A | * | 8/1967 | Kalpin ................ | 280/29 |
| 4,555,827 A | * | 12/1985 | St. Louis ................ | 16/34 |
| 5,903,956 A | * | 5/1999 | Theising ................ | 16/19 |
| 6,109,625 A | * | 8/2000 | Hewitt ................ | 280/43.24 |
| 2003/0057667 A1 | * | 3/2003 | Trescott ................ | 280/43 |

* cited by examiner

*Primary Examiner*—Bryan Fischmann
(74) *Attorney, Agent, or Firm*—Rosenberg, Klein & Lee (57) ABSTRACT

A mobile base includes a main body having a first side formed with two first foot portions and a second side formed with two second foot portions, two fixing rollers each mounted on a respective first foot portion, an adjusting plate mounted between the second foot portions, an adjusting roller mounted on the adjusting plate to move therewith, and an adjusting unit mounted between the second foot portions and urged on the adjusting plate to press the adjusting plate to move. Thus, the adjusting unit is hidden in a space between the first side rack and the second side rack, so that the adjusting unit is not operated unintentionally.

20 Claims, 7 Drawing Sheets

MOBILE BASE

BACKGROUND OF THE INVENTION

1. Field of the Invention

The present invention relates to a mobile base, and more particularly to a mobile base for a miniature tool, such as a small-size sawing table, a small-size tool machine or the like.

2. Description of the Related Art

Figure 6:
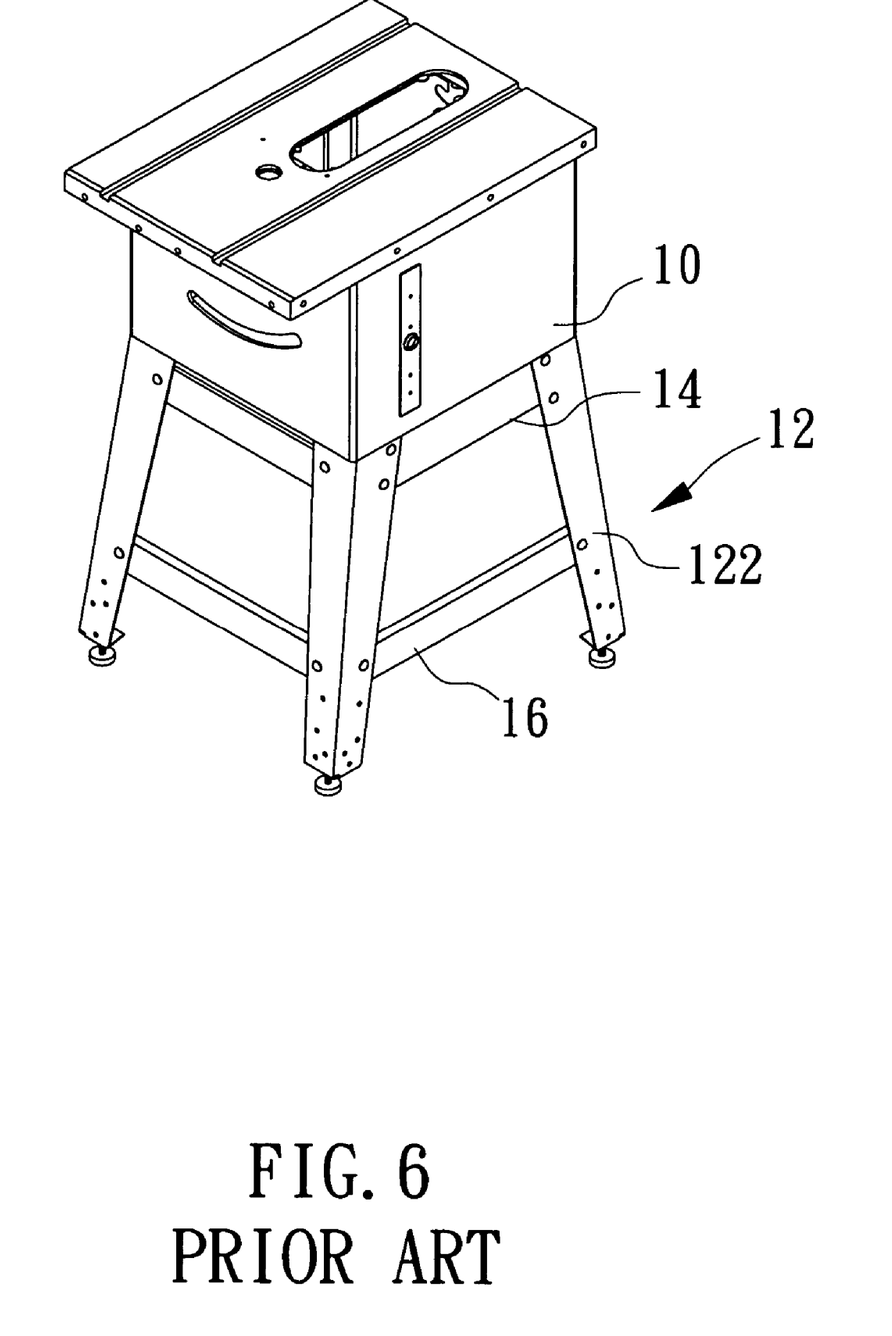
FIG. 6 is a perspective view of a conventional base for a small-size sawing table in accordance with the prior art.
Figure 7:
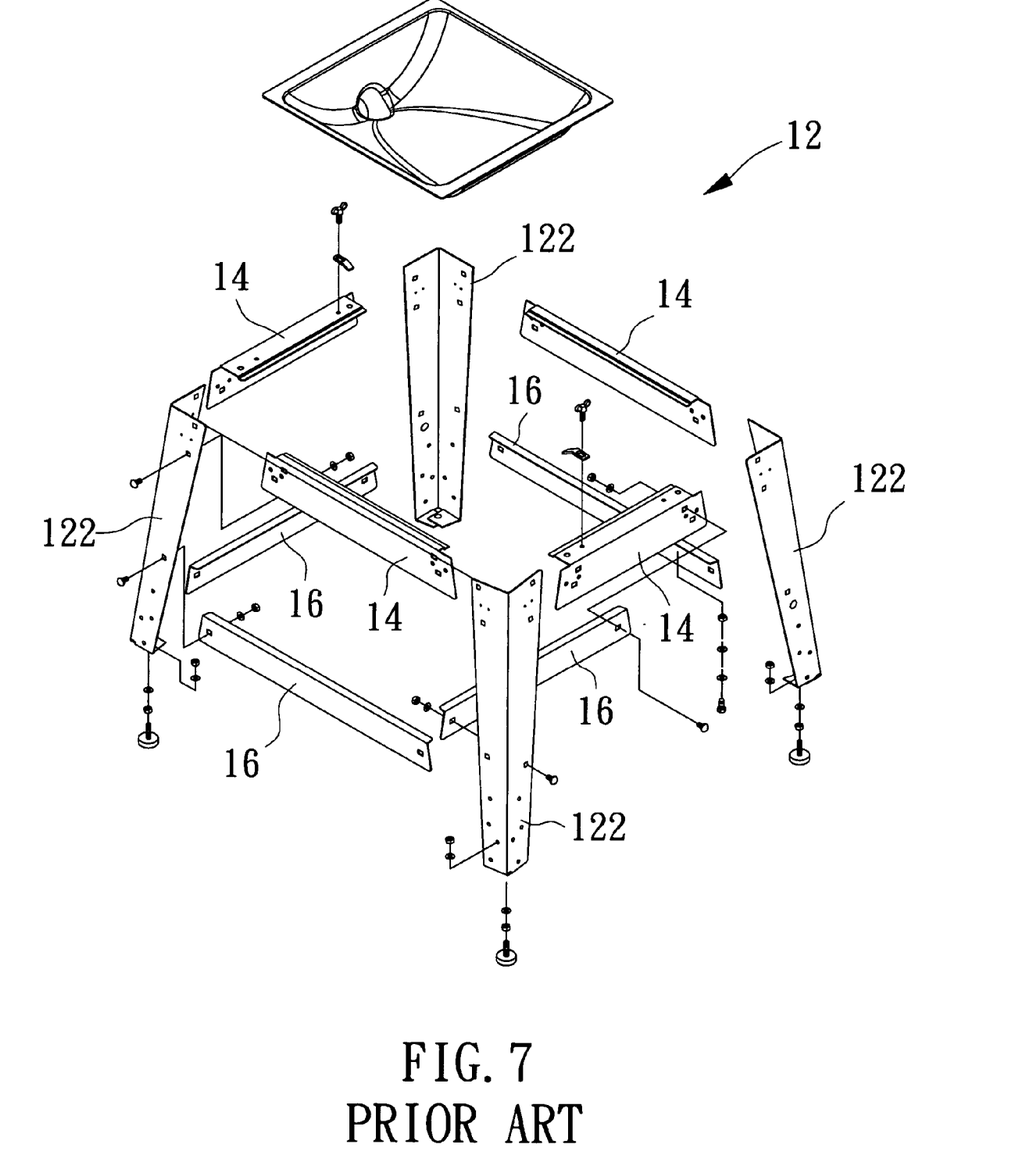
FIG. 7 is an exploded perspective view of the conventional base for a small-size sawing table in accordance with the prior art.

A conventional base 12 in accordance with the prior art shown in FIGS. 6 and 7 is used to support a small-size sawing table 10 and comprises four upright posts 122, four upper transverse bars 14 mounted between upper portions of the four upright posts 122, and four lower transverse bars 16 mounted between lower portions of the four upright posts 122. However, the conventional base 12 is fixed and cannot be moved easily, thereby causing inconvenience to the user when he wishes to move the conventional base 12. In addition, the conventional base 12 has a complicated construction with more parts, thereby increasing time of assembly and disassembly, and thereby causing inconvenience to the user when mounting the conventional base 12.

The closest prior art references of which the applicant is aware are disclosed in U.S. Pat. Nos. 5,431,254, 5,903,956, and 6,109,625.

SUMMARY OF THE INVENTION

The primary objective of the present invention is to provide a mobile base for a miniature tool, such as a small-size sawing table, a small-size tool machine or the like.

Another objective of the present invention is to provide a mobile base that has a simplified construction with fewer parts, thereby saving time of assembly and disassembly, and thereby facilitating the user mounting the mobile base.

A further objective of the present invention is to provide a mobile base that is assembled by a first side rack, a second side rack, a plurality of upper transverse bars, and a plurality of lower transverse bars, so that the mobile base has a rigid and stable structure.

A further objective of the present invention is to provide a mobile base, wherein the adjusting roller is hidden in the respective lower transverse bar, and the adjusting unit is hidden in a space between the first side rack and the second side rack, so that the adjusting unit is not operated unintentionally.

In accordance with the present invention, there is provided a mobile base, comprising:

a main body having a first side formed with two first foot portions and a second side formed with two second foot portions;

two fixing rollers each mounted on a respective one of the two first foot portions of the main body;

an adjusting plate mounted between the two second foot portions of the main body;

an adjusting roller mounted on the adjusting plate to move therewith; and an adjusting unit mounted between the two second foot portions of the main body and urged on the adjusting plate to press the adjusting plate to move toward a ground and to move outward relative to the ground.

Further benefits and advantages of the present invention will become apparent after a careful reading of the detailed description with appropriate reference to the accompanying drawings.

DETAILED DESCRIPTION OF THE INVENTION

Figure 1:
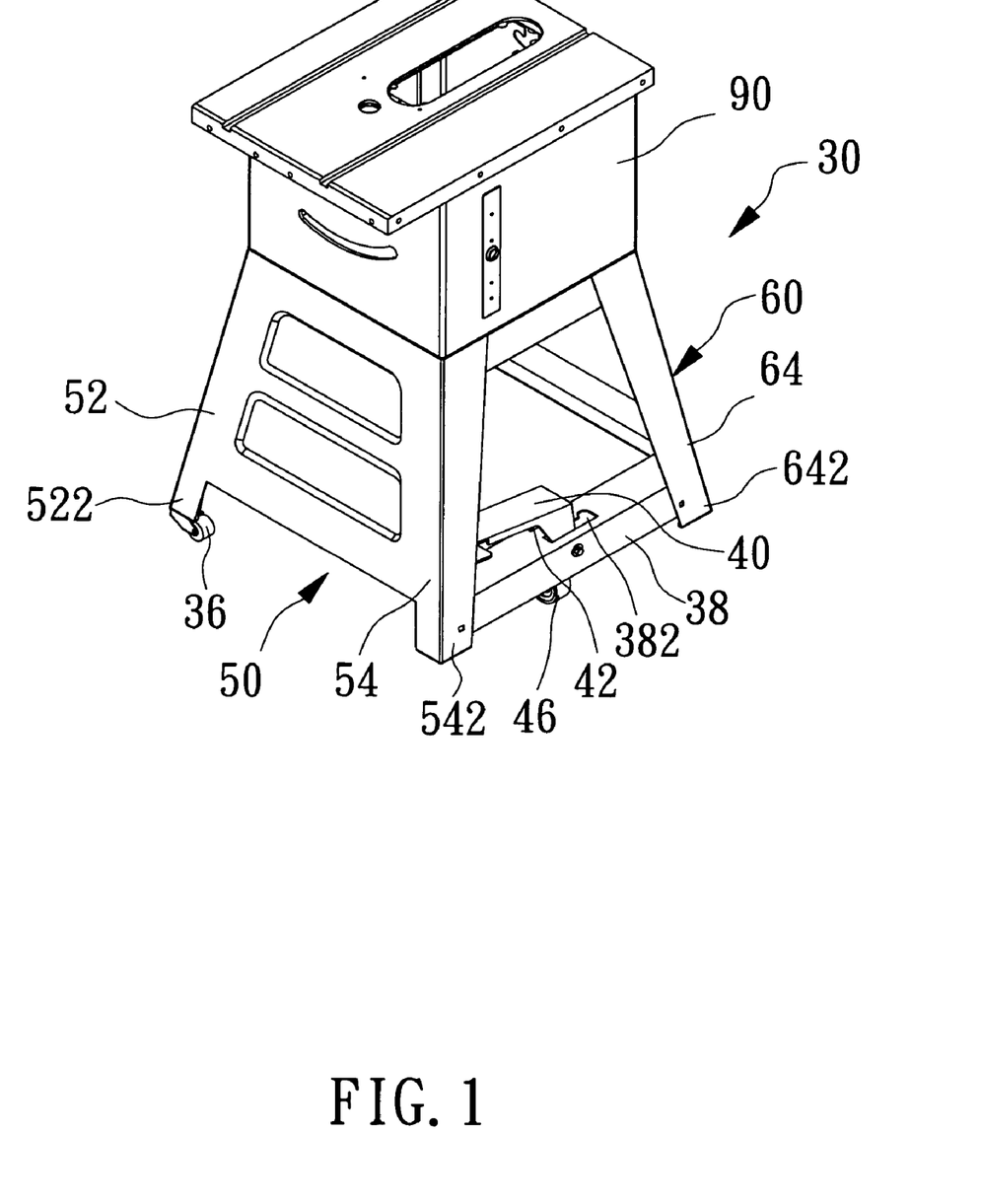
FIG. 1 is a perspective view of a mobile base in accordance with the preferred embodiment of the present invention.
Figure 2:
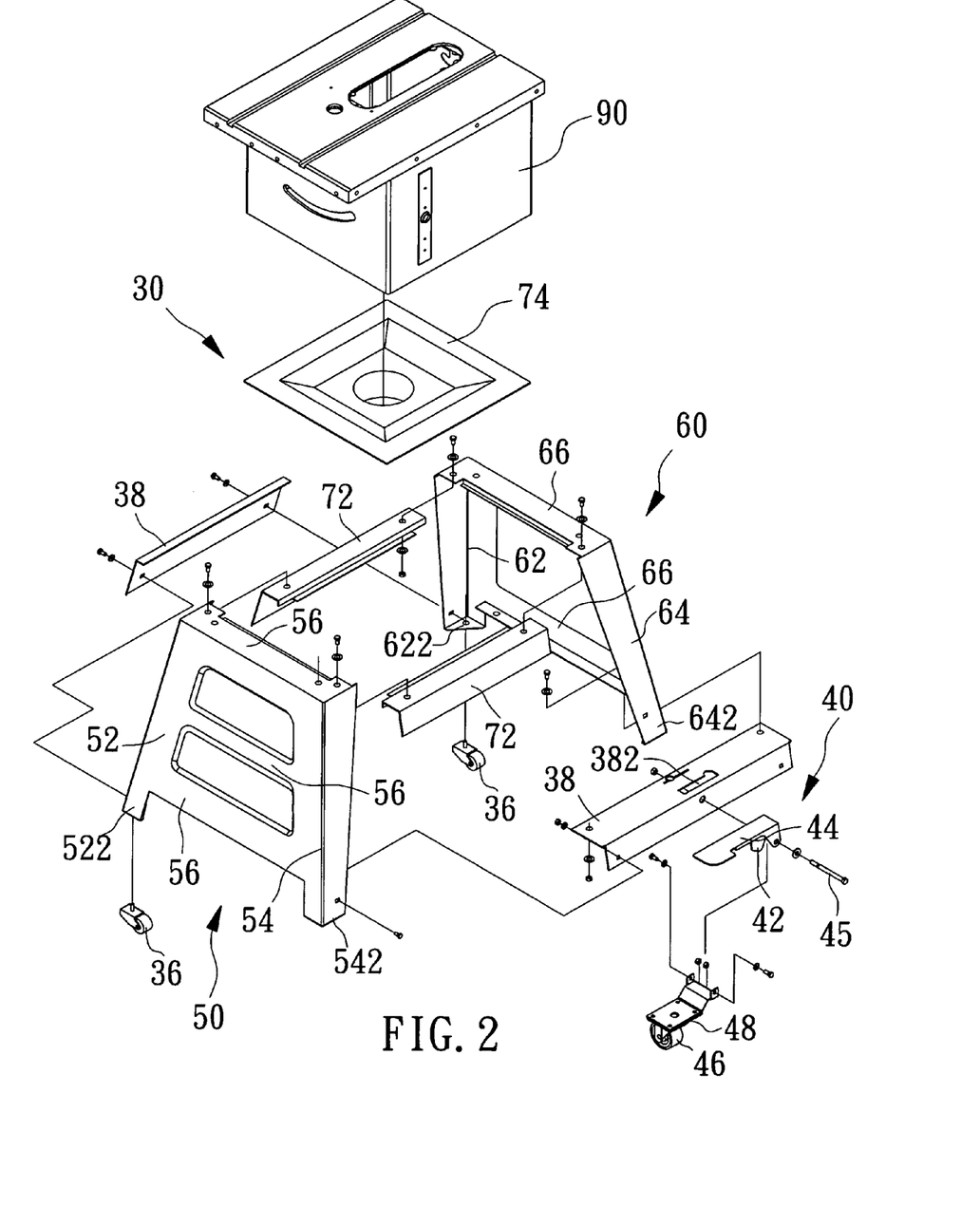
FIG. 2 is an exploded perspective view of the mobile base in accordance with the preferred embodiment of the present invention.
Figure 3:
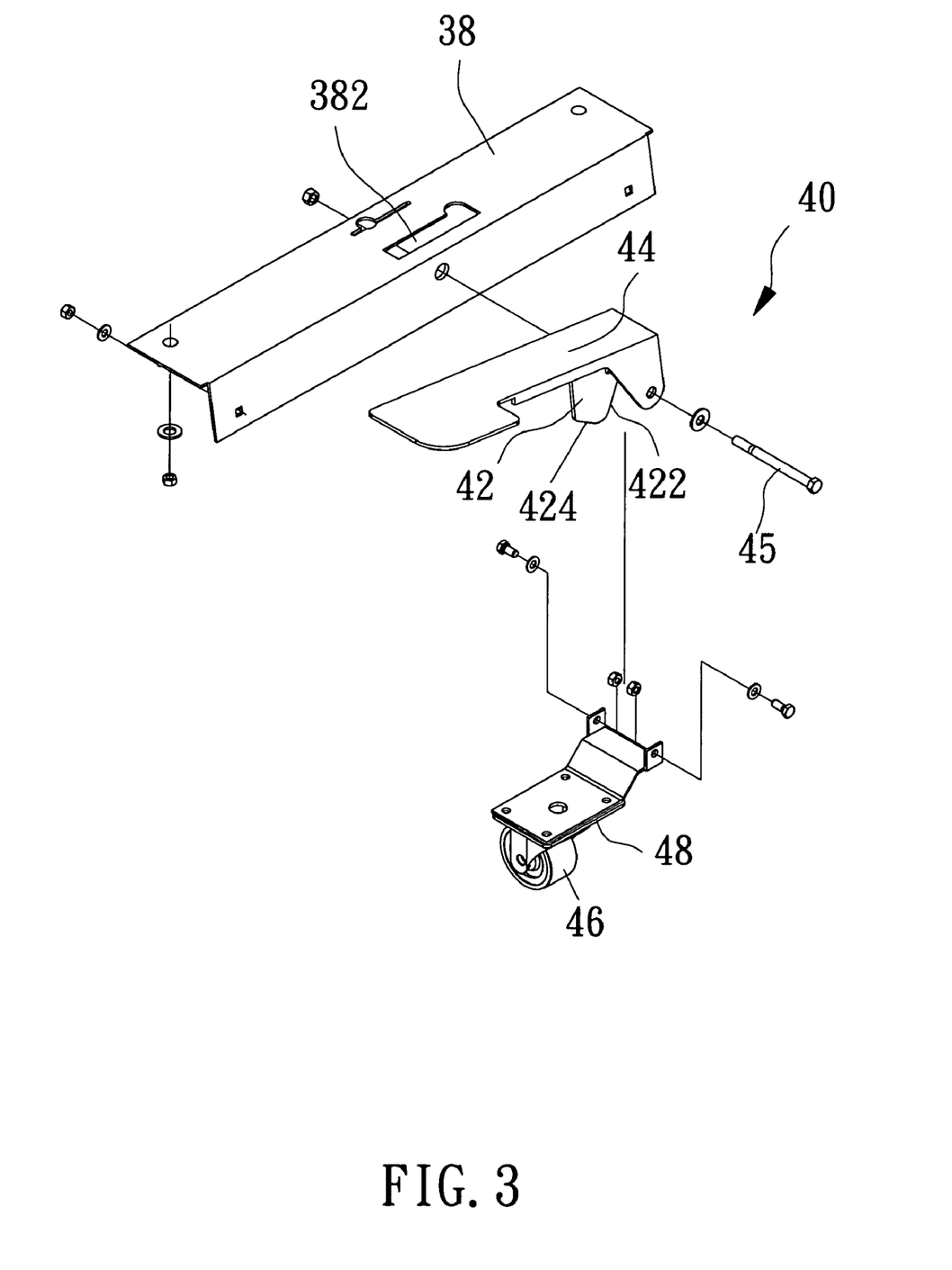
FIG. 3 is a partially exploded perspective view of the mobile base in accordance with the preferred embodiment of the present invention.

Referring to the drawings and initially to FIGS. 1–3, a mobile base 30 in accordance with the preferred embodiment of the present invention is used to support a small-size sawing table 90 and comprises a first side rack 50, a second side rack 60, a plurality of upper transverse bars 72 mounted between the first side rack 50 and the second side rack 60, and a plurality of lower transverse bars 38 mounted between the first side rack 50 and the second side rack 60.

The first side rack 50 has a first side formed with a first leg 52 having a lower end formed with a first foot portion 522 provided with a fixing roller 36 and a second side formed with a second leg 54 having a lower end formed with a second foot portion 542. The first side rack 50 includes a plurality of transverse portions 56 mounted between the first leg 52 and the second leg 54.

The second side rack 60 has a first side formed with a first leg 62 having a lower end formed with a first foot portion 622 provided with a fixing roller 36 and a second side formed with a second leg 64 having a lower end formed with a second foot portion 642. The second side rack 60 includes a plurality of transverse portions 66 mounted between the first leg 62 and the second leg 64.

In practice, the first foot portion 522 of the first leg 52 of the first side rack 50 is provided with the fixing roller 36, and the first foot portion 622 of the first leg 62 of the second side rack 60 is also provided with the fixing roller 36, so that the first foot portion 522 of the first side rack 50 and the first foot portion 622 of the second side rack 60 are defined to be located at the same side. Similarly, the second foot portion 542 of the first side rack 50 and the second foot portion 642 of the second side rack 60 are defined to be located at the same side.

In addition, the mobile base 30 further comprises a support tray 74 mounted on the first side rack 50 and the second side rack 60 to support the small-size sawing table 90.

In addition, the mobile base 30 further comprises an adjusting plate 48 mounted on the respective lower transverse bar 38, and an adjusting roller 46 mounted on the adjusting plate 48 to move therewith. Preferably, the adjusting plate 48 is made of elastic material and has a bent structure.

In addition, the mobile base 30 further comprises an adjusting unit 40 mounted on a respective lower transverse bar 38 located between the second foot portion 542 of the first side rack 50 and the second foot portion 642 of the second side rack 60. The adjusting unit 40 is a lever mechanism and includes a cam 42 pivotally mounted on the respective lower transverse bar 38 and rested on the adjusting plate 48, and an operation handle 44 mounted on the cam 42 to drive the cam 42 to pivot on the respective lower transverse bar 38.

The cam 42 is pivotally mounted on the respective lower transverse bar 38 by a pivot shaft 45. The respective lower transverse bar 38 is formed with an elongated slot 382, and the cam 42 is extended through the elongated slot 382 of the respective lower transverse bar 38. The cam 42 has a first side formed with a first urging face 422 and a second side formed with a second urging face 424. The first urging face 422 and the second urging face 424 of the cam 42 are oblique and are directed toward different directions. The first urging face 422 and the second urging face 424 of the cam 42 are juxtaposed to each other.

Figure 4:
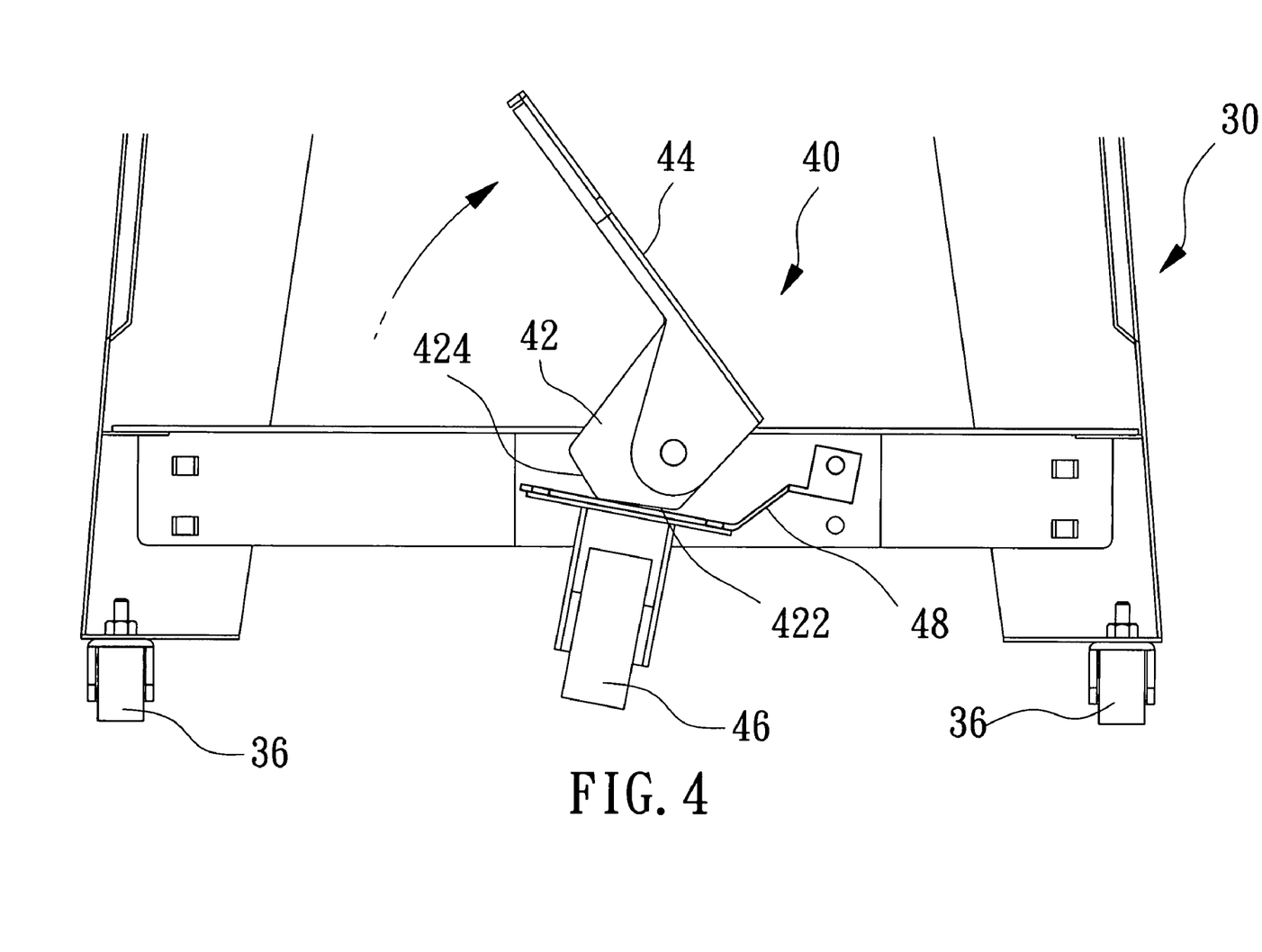
FIG. 4 is a plan cross-sectional operational view of the mobile base in accordance with the preferred embodiment of the present invention.
Figure 5:
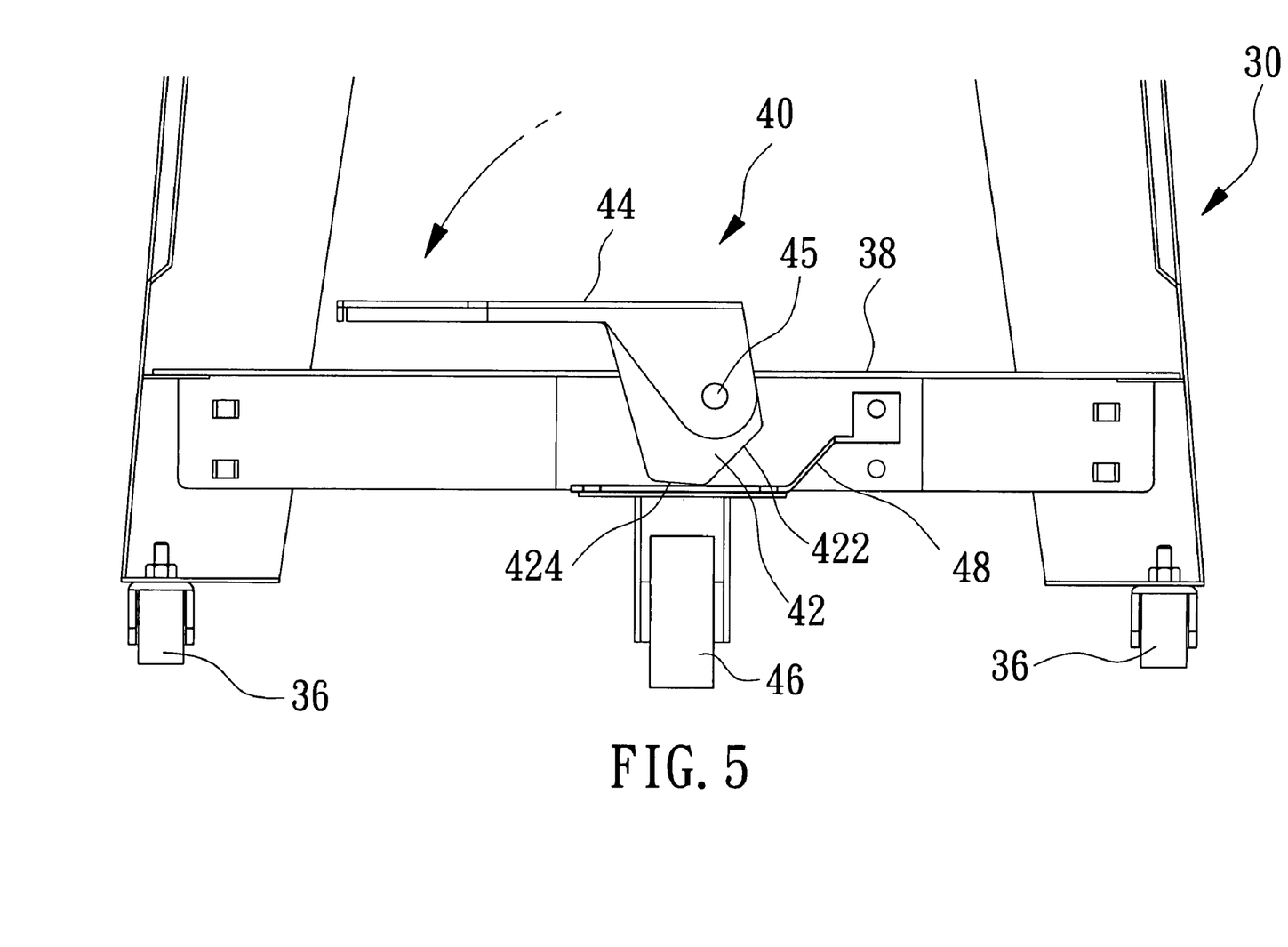
FIG. 5 is a plan cross-sectional operational view of the mobile base in accordance with the preferred embodiment of the present invention.

In operation, referring to FIGS. 4 and 5 with reference to FIGS. 1–3, when the operation handle 44 of the adjusting unit 40 is pulled to move outward relative to the adjusting plate 48, the cam 42 is pivoted relative to the adjusting plate 48 to move to the position as shown in FIG. 4 where the first urging face 422 of the cam 42 is spaced from the adjusting plate 48, so that the adjusting plate 48 is moved upward by its elastic force to move the adjusting roller 46 upward to locate the adjusting roller 46 at a level higher than that of the second foot portion 542 of the first side rack 50 and the second foot portion 642 of the second side rack 60. Thus, the adjusting roller 46 is spaced from the ground so that the base 30 is fixed on the ground by the drag effect of the second foot portion 542 of the first side rack 50 and the second foot portion 642 of the second side rack 60.

Alternatively, when the operation handle 44 of the adjusting unit 40 is pushed to move toward the adjusting plate 48, the cam 42 is pivoted relative to the adjusting plate 48 to move to the position as shown in FIG. 5 where the second urging face 424 of the cam 42 is urged on the adjusting plate 48, so that the adjusting plate 48 is moved downward to move the adjusting roller 46 downward to locate the adjusting roller 46 at a level lower than that of the second foot portion 542 of the first side rack 50 and the second foot portion 642 of the second side rack 60. Thus, the adjusting roller 46 is rested on the ground so that the base 30 is movable on the ground by co-operation of the adjusting roller 46 and the two fixing rollers 36.

Accordingly, the mobile base 30 has a simplified construction with fewer parts, thereby saving time of assembly and disassembly, and thereby facilitating the user mounting the mobile base 30. In addition, the mobile base 30 is assembled by a first side rack 50, a second side rack 60, a plurality of upper transverse bars 72, and a plurality of lower transverse bars 38, so that the mobile base 30 has a rigid and stale structure. Further, the adjusting roller 46 is hidden in the respective lower transverse bar 38, and the adjusting unit 40 is hidden in a space between the first side rack 50 and the second side rack 60, so that the adjusting unit 40 is not operated unintentionally.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A mobile base, comprising:
   a main body having a first side formed with two first foot portions and a second side formed with two second foot portions;
   two fixing rollers each mounted on a respective one of the two first foot portions of the main body;
   an adjusting plate mounted between the two second foot portions of the main body;
   an adjusting roller mounted on the adjusting plate to move therewith; and
   an adjusting unit mounted between the two second foot portions of the main body and urged on the adjusting plate to press the adjusting plate to move toward a ground and to move outward relative to the ground.

2. The mobile base in accordance with claim 1, wherein the adjusting roller is hidden in a bottom face of the main body.

3. The mobile base in accordance with claim 1, wherein the adjusting plate is movable between a first position where the adjusting roller is located at a level higher than that of the second foot portions of the main body and a second position where the adjusting roller is located at a level lower than that of the second foot portions of the main body.

4. The mobile base in accordance with claim 1, wherein the main body includes a first side rack having a first side formed with one of the two first foot portions and a second side formed with one of the two second foot portions, a second side rack having a first side formed with the other one of the two first foot portions and a second side formed with the other one of the two second foot portions, two upper transverse bars mounted between the first side rack and the second side rack, and two lower transverse bars mounted between the first side rack and the second side rack.

5. The mobile base in accordance with claim 4, wherein the first side rack includes a plurality of transverse portions mounted between the first leg and the second leg.

6. The mobile base in accordance with claim 4, wherein the second side rack includes a plurality of transverse portions mounted between the first leg and the second leg.

7. The mobile base in accordance with claim 4, further comprising a support tray mounted on the first side rack and the second side rack.

8. The mobile base in accordance with claim 4, wherein the adjusting plate is mounted on a respective lower transverse bar between the two second foot portions of the main body.

9. The mobile base in accordance with claim 4, wherein the adjusting unit is mounted on a respective lower transverse bar between the two second foot portions of the main body.

10. The mobile base in accordance with claim 9, wherein the adjusting unit includes a cam pivotally mounted on the respective lower transverse bar and rested on the adjusting plate, and an operation handle mounted on the cam to drive the cam to pivot on the respective lower transverse bar.

11. The mobile base in accordance with claim 10, wherein the cam is pivotally mounted on the respective lower transverse bar by a pivot shaft.

12. The mobile base in accordance with claim 10, wherein the respective lower transverse bar is formed with an elongated slot, and the cam is extended through the elongated slot of the respective lower transverse bar.

13. The mobile base in accordance with claim 10, wherein the cam has a first side formed with a first urging face that is movable with the cam to press the adjusting plate and a second side formed with a second urging face that is movable with the cam to press the adjusting plate.

14. The mobile base in accordance with claim 13, wherein the first urging face and the second urging face of the cam are oblique and are directed toward different directions.

15. The mobile base in accordance with claim 13, wherein the first urging face and the second urging face of the cam are juxtaposed to each other.

16. The mobile base in accordance with claim 13, wherein the cam is pivoted relative to the adjusting plate to move between a first position where the first urging face of the cam is aligned with and spaced from the adjusting plate, so that the adjusting plate is moved upward by its elastic force to move the adjusting roller upward to locate the adjusting roller at a level higher than that of the second foot portions of the main body and a second position where the second urging face of the cam is urged on the adjusting plate, so that the adjusting plate is moved downward to move the adjusting roller downward to locate the adjusting roller at a level lower than that of the second foot portions of the main body.

17. The mobile base in accordance with claim 9, wherein the adjusting roller is hidden in the respective lower transverse bar.

18. The mobile base in accordance with claim 1, wherein the adjusting unit is hidden in a space between the first side rack and the second side rack.

19. The mobile base in accordance with claim 1, wherein the adjusting plate is made of elastic material and has a bent structure.

20. The mobile base in accordance with claim 1, wherein the adjusting unit is a lever mechanism.

* * * * *